United States Patent
Kitahata et al.

(10) Patent No.: US 7,452,850 B2
(45) Date of Patent: Nov. 18, 2008

(54) LUBRICANT COMPOSITION AND SPEED REDUCER USING THE SAME, AND ELECTRICALLY OPERATED POWER STEERING DEVICE USING THE SAME

(75) Inventors: Kouji Kitahata, Osaka (JP); Fumiaki Kasahara, Kashiwara (JP); Naoki Uchida, Takaishi (JP); Noritake Ookawa, Kurashiki (JP); Hiroaki Murakami, Kashihara (JP)

(73) Assignee: Jtekt Corporation, Osaka (JP)

( * ) Notice: Subject to any disclaimer, the term of this patent is extended or adjusted under 35 U.S.C. 154(b) by 449 days.

(21) Appl. No.: 10/529,047

(22) PCT Filed: Sep. 25, 2003

(86) PCT No.: PCT/JP03/12198

§ 371 (c)(1),
(2), (4) Date: Mar. 24, 2005

(87) PCT Pub. No.: WO2004/029184

PCT Pub. Date: Apr. 8, 2004

(65) Prior Publication Data

US 2006/0058201 A1    Mar. 16, 2006

(30) Foreign Application Priority Data

Sep. 25, 2002 (JP) ............................. 2002-279815
Jul. 16, 2003 (JP) ............................. 2003-197946

(51) Int. Cl.
*C10M 105/34* (2006.01)

(52) U.S. Cl. ................................... 508/464

(58) Field of Classification Search .................. 508/464
See application file for complete search history.

(56) References Cited

U.S. PATENT DOCUMENTS

| 4,123,367 | A | * | 10/1978 | Dodd ......................... 507/140 |
| 5,415,791 | A | | 5/1995 | Chou et al. |
| 5,792,727 | A | * | 8/1998 | Jacobs ........................ 508/113 |
| 6,250,420 | B1 | * | 6/2001 | Brenner et al. ............. 180/443 |
| 2002/0039973 | A1 | * | 4/2002 | Baum et al. ................. 508/552 |
| 2003/0136211 | A1 | | 7/2003 | Ishii et al. |

FOREIGN PATENT DOCUMENTS

| DE | 198 39 296 A1 | 3/2000 |
| EP | 244099 | 11/1987 |
| JP | 53-71108 | 6/1978 |

(Continued)

*Primary Examiner*—Glenn Caldarola
*Assistant Examiner*—Jim Goloboy
(74) *Attorney, Agent, or Firm*—Rabin & Berdo, PC (57) ABSTRACT

Disclosed are a lubricant composition obtained by adding a buffer particles having an average particle diameter $D_1$ of 50 $\mu m < D_1 \leq 300$ $\mu m$ to a lubricant, a speed reduction gear filled with the lubricant composition, and an electric power steering apparatus having the speed reduction gear incorporated therein, and noise produced in the speed reduction gear can be made lower than ever before irrespective of the magnitude of backlash in a case where a worm and a worm wheel are combined with each other and without complicating the configuration of the speed reduction gear by the buffer action of the buffer particles added to the lubricant composition, thereby making it possible to reduce noise produced in an automobile caused by the electric power steering apparatus at low cost.

7 Claims, 8 Drawing Sheets

FOREIGN PATENT DOCUMENTS

| | | |
|---|---|---|
| JP | 59-155497 | 9/1984 |
| JP | 61-179453 | 11/1986 |
| JP | 4-266995 | 9/1992 |
| JP | 07-173483 | 7/1995 |
| JP | 8-209167 | 8/1996 |
| JP | 2000-43739 | 2/2000 |
| JP | 2001-181668 | 7/2001 |
| JP | 2001-354986 | 12/2001 |
| JP | 2002-3872 | 1/2002 |

* cited by examiner

LUBRICANT COMPOSITION AND SPEED REDUCER USING THE SAME, AND ELECTRICALLY OPERATED POWER STEERING DEVICE USING THE SAME

PRIOR ART

The present invention relates to a lubricant composition that can be suitably used for a speed reduction gear having a small gear such as a worm and a large gear such as a worm wheel, a speed reduction gear filled with the lubricant composition, and an electric power steering apparatus comprising the speed reduction gear.

BACKGROUND ART

Speed reduction gears are used for electric power steering apparatuses for automobiles. In a column type EPS (Electric Power Steering System), for example, rotation of an electric motor is transmitted from a small gear such as a worm to a large gear such as a worm wheel in a speed reduction gear to reduce its speed as well as to amplify its output, and is then provided to a column, thereby torque-assisting a steering operation.

Suitable backlash is required to engage the small and large gears which serve as a speed reduction mechanism. At the time of forward/backward rotation of the gears and in a case where an automobile travels on a punishing road such as a stone pavement so that a reaction force from a tire is inputted, for example, however, a teeth striking sound may, in some cases, be produced due to the backlash. When the teeth striking sound is transmitted as noise to the inside of the automobile, an uncomfortable feeling is given to a driver.

Therefore, so-called by-layer assembly for selecting a combination of the gears such that suitable backlash is obtained to assemble a speed reduction gear has been conventionally carried out. In such a method, however, the productivity is significantly low. Another problem is that even if the by-layer assembly is carried out, there occurs nonuniformity of a steering torque due to offcenter of a shaft of a worm wheel.

The same problems exist in not only speed reduction gear in electric power steering apparatus but also general speed reduction gear having the small and large gears.

In a speed reduction gear in an electric power steering apparatus, for example, therefore, it has been proposed that backlash is eliminated by providing urging means such as a spring member for making it possible for a worm shaft to be eccentric toward a worm wheel as well as urging the worm shaft in the direction of eccentricity (see Japanese Unexamined Patent Publication No. 2000-43739, for example).

However, the configuration of the above-mentioned speed reduction gear becomes significantly complicated, resulting in raised manufacturing cost.

DISCLOSURE OF INVENTION

An object of the present invention is to provide a lubricant composition capable of making noise produced in a speed reduction gear lower than ever before irrespective of the dimension of backlash in a case where the small and large gears are combined with each other and without complicating the configuration of the speed reduction gear, a speed reduction gear which hardly produces noise by using the lubricant composition, and an electric power steering apparatus using the speed reduction gear.

A lubricant composition according to the present invention is characterized by comprising a lubricant, and buffer particles having an average particle diameter $D_1$ of 50 $\mu m < D_1 \leq 300$ $\mu m$.

According to the present invention, the buffer particles dispersed in the lubricant composition are interposed in an engaged portion of the small and large gears to buffer the lubricant composition from a collision between both their gear teeth surfaces to reduce a teeth striking sound, thereby making it possible to reduce noise produced in the speed reduction gear. Moreover, the noise can be reduced at low cost without complicating the configuration of the speed reduction gear only by merely adding the buffer particles to the lubricant.

It is preferable that the buffer particles are spherical particles.

An advantage of a case where the spherical buffer particles are used, the fluidity of the lubricant composition is improved, thereby making it possible to prevent a steering torque produced by the electric power steering apparatus from being excessively raised.

It is preferable that the buffer particles are formed of a buffering material whose Young's modulus is 0.1 to $10^4$ MPa.

An advantage of a case where the buffer particles formed of the buffering material whose Young's modulus is within the above-mentioned range are used, the effect of reducing a teeth striking sound is further improved, and the rise in a steering torque and the production of a sliding sound can be reliably prevented.

It is preferable that the buffer particles are formed of a cured material of curable urethane resin.

The buffer particles composed of the cured material of curable urethane resin can arbitrarily set characteristics such as the Young's modulus by adjusting the degree of hardness of the urethane resin.

It is preferable that the mixing ratio of the buffer particles is 20 to 300 parts by weight per 100 parts by weight of the lubricant.

An advantage of a case where the mixing ratio of the buffer particles is within the above-mentioned range, the effect of reducing a teeth striking sound is further improved, and the rise in a steering torque and the production of a sliding sound can be reliably prevented.

The lubricant may be semisolid grease, or may be liquid lubricating oil.

When the lubricant is the grease, it is preferable in using the lubricant composition for the speed reduction gear that the consistency of the lubricant composition having the buffer particles added thereto is No. 2 to No. 000 in terms of an NLGI (National Lubricating Grease Institute) number.

When the lubricant is the liquid lubricating oil, it is similarly preferable in using the lubricant composition for the speed reduction gear that the kinetic viscosity thereof is 5 to 200 mm$^2$/s (40° C.).

A speed reduction gear according to the present invention is characterized by comprising a small gear and a large gear, and in that an area including an engaged portion of both the gears is filled with the above-mentioned lubricant composition, and is preferable in that noise such as a teeth striking sound caused by backlash can be reduced.

Furthermore, an electric power steering apparatus according to the present invention is characterized in that an output of a motor for steering assist is transmitted to a steering mechanism by reducing its speed through the above-mentioned speed reduction gear, and is preferable in that noise produced in an automobile can be reduced at low cost.

BEST MODE FOR CARRYING OUT THE INVENTION

The present invention will be described in detail below.

<Lubricant Composition>

A lubricant composition according to the present invention comprises a lubricant and buffer particles, as described above.

The average particle diameter $D_1$ of the buffer particles must satisfy $50\ \mu m < D_1 \leq 300\ \mu m$.

When the average particle diameter $D_1$ of the buffer particles is less than 50 μm, the effect of absorbing shock in engagement between a small gear and a large gear to reduce a teeth striking sound has a limitation, so that noise produced in a speed reduction gear cannot be significantly reduced. When the average particle diameter $D_1$ exceeds 300 μm, a steering torque produced by an electric power steering apparatus rises, and a sliding sound is produced so that the noise produced in the speed reduction gear is rather increased.

It is preferable that the average particle diameter of the buffer particles is particularly not less than 100 μm in the above-mentioned range, considering that the effect of reducing the teeth striking sound is further improved. Further, it is preferable that the average particle diameter of the buffer particles is particularly not more than 200 μm in the above-mentioned range, considering that the rise in the steering torque and the production of the sliding sound are more reliably prevented.

Various types of shapes such as a spherical shape, a granular shape, a flake shape, and a stick shape can be selected as the shape of the buffer particles. However, the spherical shape or the granular shape is preferable, and the spherical shape is particularly preferable, considering the fluidity or the like of the lubricant composition.

It is preferable that Young's modulus of the one used as the buffering material forming the buffer particles is in a range of 0.1 to $10^4$ MPa.

A buffering material whose Young's modulus is less than 0.1 MPa is too soft. Therefore, the effect of reducing the noise produced in the speed reduction gear by absorbing shock with the buffering material interposed in the engaged portion of the gears to reduce the teeth striking sound may not be sufficiently obtained. When the Young's modulus of the buffering material exceeds $10^4$ MPa, the steering torque produced by the electric power steering apparatus rises, and the sliding sound is produced so that the noise produced in the speed reduction gear may be rather increased.

It is preferable that the Young's modulus of the buffering material forming the buffer particles is particularly not less than 0.5 MPa in the above-mentioned range, considering that the effect of reducing the teeth striking sound is further improved. Further, it is preferable that the Young's modulus of the buffering material is particularly not more than $10^2$ MPa in the above-mentioned range, considering that the rise in the steering torque and the production of the sliding sound are more reliably prevented.

The other characteristics of the buffer particles are not particularly limited. However, it is preferable that the tensile strength of the buffering material forming the buffer particles is 1 to 50 MPa.

It is preferable that the hardness of the buffering material forming the buffer particles is not less than 10 in terms of Shore D hardness, and is not more than 110 in terms of Rockwell hardness (R scale).

Usable as such buffer particles are any of various ones, composed of rubber or soft resin, having rubber elasticity.

Examples of the soft resin include polyolefin resin, polyamide resin, polyester resin, polyacetal resin, polyphenylene oxide resin, polyimide resin, fluororesin, and thermoplastic or curable (crosslinking) urethane resin. Further, it is also possible to use thermoplastic elastomers having oil resistance such as thermoplastic elastomer olefin, thermoplastic elastomer urethane, thermoplastic elastomer polyester, thermoplastic elastomer polyamide and thermoplastic elastomer fluorine.

Examples of the rubber include ethylene-propylene copolymer (EPM), ethylene-propylene-diene copolymer (EPDM), silicone rubber, and urethane rubber (U).

However, it is preferable that spherical buffer particles formed of a cured material of curable urethane resin are used, considering heat resistance, durability, and so on.

Furthermore, the buffer particles formed of the cured material of curable urethane resin also have the advantage that the Young's modulus, the tensile strength, and the hardness can be arbitrarily set by adjusting the degree of hardness (the degree of crosslinking) of the urethane resin.

It is preferable that the mixing ratio of the buffer particles is 20 to 300 parts by weight per 100 parts by weight of the lubricant.

In a case where the mixing ratio of the buffer particles is less than 20 parts by weight, the effect of reducing the noise produced in the speed reduction gear by absorbing shock with the buffer particles interposed in the engaged portion of the gears to reduce the teeth striking sound may be insufficient. When the mixing ratio of the buffer particles exceeds 300 parts by weight, the steering torque produced by the electric power steering apparatus rises, and the sliding sound is produced so that the noise produced in the speed reduction gear may be rather increased.

It is preferable that the mixing ratio of the buffer particles is particularly not less than 25 parts by weight in the above-mentioned range per 100 parts by weight of the lubricant, considering that the effect of reducing the teeth striking sound is further improved. It is preferable that the mixing ratio of the buffer particles is particularly not more than 100 parts by weight in the above-mentioned range, considering that the rise in the steering torque and the production of the sliding sound are more reliably prevented.

As the lubricant for dispersing the buffer particles, either liquid lubricating oil or semisolid grease may be used.

Preferably used as the lubricating oil is one whose kinetic viscosity is 5 to 200 mm$^2$/s (40° C.) and is particularly 20 to 100 mm$^2$/s (40° C.).

Although synthetic hydrocarbon oil (e.g., poly($\alpha$-olefin) oil) is preferable as the lubricating oil, synthetic oil such as silicone oil, fluorine oil, ester oil, and ether oil, and mineral oil can be also used. The lubricating oils can be used alone or may be used in combination.

A solid lubricant (molybdenum disulfide, graphite, PTFE (poly(tetrafluoroethylene)), etc.), a phosphorous- or sulfur-based extreme-pressure additive, an antioxidant such as tributylphenol or methylphenol, a rust preventive, a metal deactivator, a viscosity index improver, an oiliness improver, etc. may be added, as required, to the lubricating oil.

On the other hand, preferably used as the grease is one whose consistency is No. 2 to No. 000 and is particularly No. 2 to No. 00 in terms of the above-mentioned NLGI number as the lubricant composition to which the buffer particles are added.

The grease is formed by adding a thickening agent to lubricating base oil, as in the conventional example.

Although synthetic hydrocarbon oil (e.g., poly($\alpha$-olefin) oil) is preferable as the lubricating base oil, synthetic oil such as silicone oil, fluorine oil, ester oil, and ether oil, and mineral oil can be also used. It is preferable that the kinetic viscosity of the lubricating base oil is 5 to 200 mm$^2$/s (40° C.) and is particularly 20to 100 mm$^2$/s (40° C.).

As the thickening agent, various types of thickening agents (soap- or non-soap-based thickening agents) conventionally known can be used.

Furthermore, a solid lubricant (molybdenum disulfide, graphite, PTFE, etc.), a phosphrous- or sulfur-based extreme-pressure additive, an antioxidant such as tributylphenol or methylphenol, a rust preventive, a metal deactivator, a viscosity index improver, an oiliness improver, etc. may be further added, as required, to the grease.

<Speed Reduction Gear and Electric Power Steering Apparatus>

Figure 1:
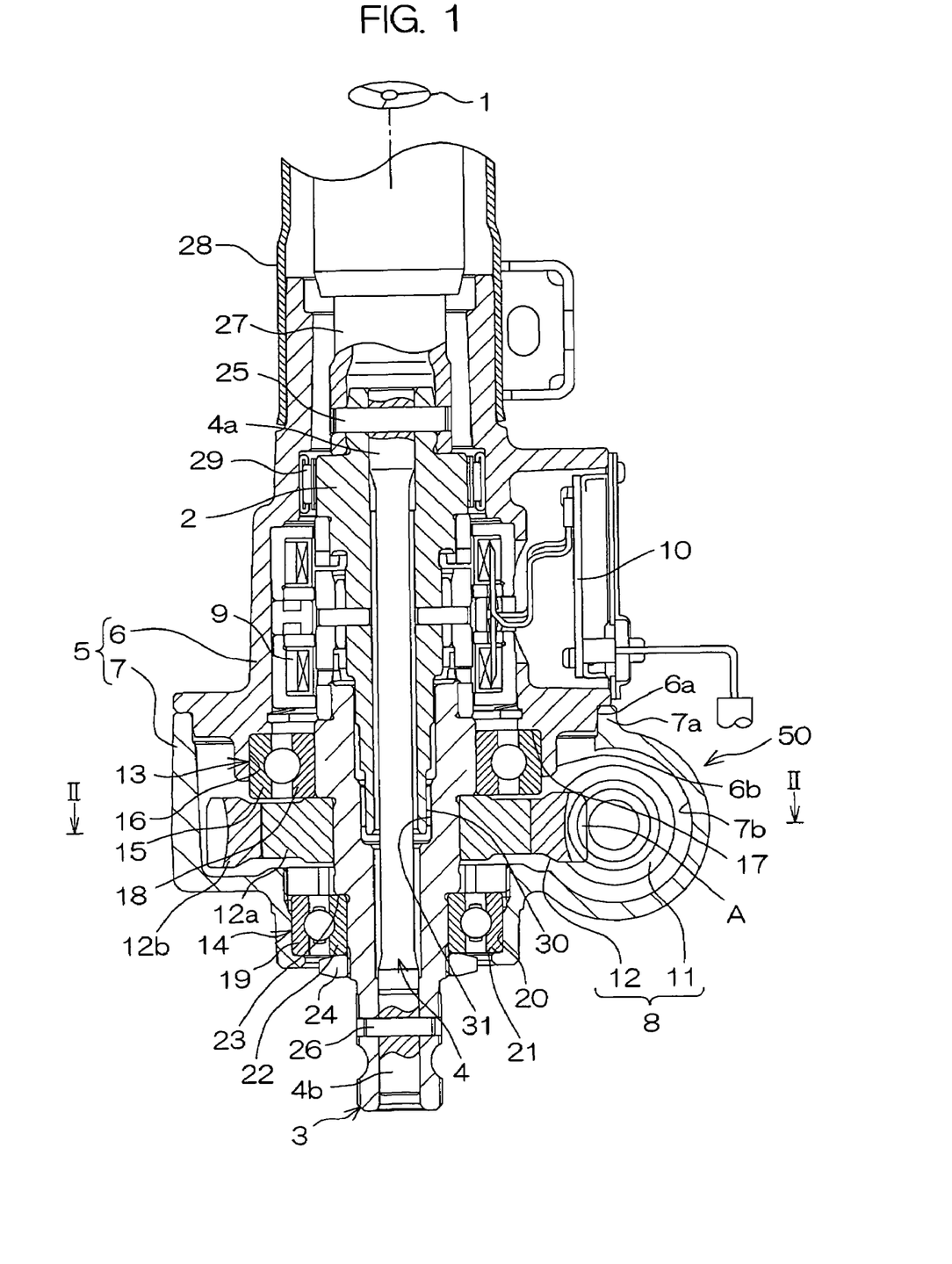
FIG. 1 is a schematic sectional view showing an electric power steering apparatus according to an embodiment of the present invention.
Figure 2:
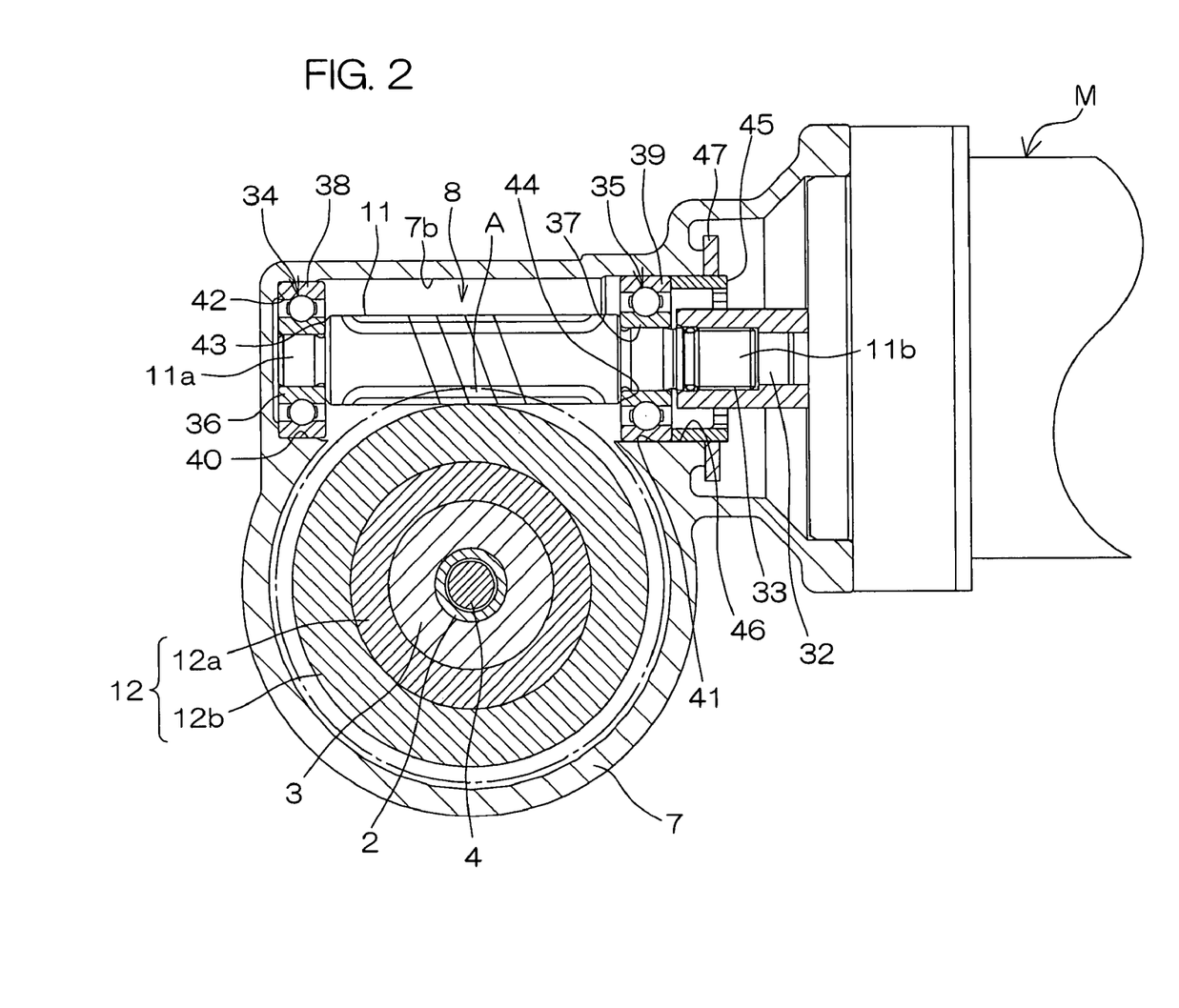
FIG. 2 is a cross-sectional view taken along a line II-II shown in FIG. 1.

FIG. 1 is a schematic sectional view of an electric power steering apparatus according to an embodiment of the present invention. FIG. 2 is a cross-sectional view taken along a line II-II shown in FIG. 1.

Referring to FIG. 1, in the electric power steering apparatus in this example, a first steering shaft 2 serving as an input shaft to which a steering wheel 1 is attached and a second steering shaft 3 serving as an output shaft connected to a steering mechanism (not shown) such as a rack-and-pinion mechanism are coaxially connected to each other through a torsion bar 4.

A housing 5 for supporting the first and second steering shafts 2 and 3 is composed of an aluminum alloy, for example, and is attached to an automobile body (not shown). The housing 5 comprises a sensor housing 6 and a gear housing 7 which are fitted to each other. Specifically, the gear housing 7 has a cylindrical shape, and an annular edge 7a at its upper end is fitted in an annular step 6a in the outer periphery at a lower end of the sensor housing 6. The gear housing 7 accommodates a worm gear mechanism 8 serving as a speed reduction mechanism, and the sensor housing 6 accommodates a torque sensor 9, a control board 10, and so on. A speed reduction gear 50 is configured by accommodating the worm gear mechanism 8 in the gear housing 7.

The worm gear mechanism 8 comprises a worm wheel 12 which is rotatable integrally with an intermediate portion in the axial direction of the second steering shaft 3 and whose movement in the axial direction is regulated, and a worm shaft 11 (see FIG. 2) which is engaged with the worm wheel 12 and is connected to a rotating shaft 32 in an electric motor M through a spline joint 33.

The worm wheel 12 comprises an annular core metal 12a coupled to the second steering shaft 3 so as to be integrally rotatable, and a synthetic resin member 12b surrounding the core metal 12a and having teeth formed on its outer peripheral surface. The core metal 12a is inserted into a metal mold at the time of resin molding of the synthetic resin member 12b, for example. The core metal 12a and the synthetic resin member 12b are coupled to and integrated with each other by resin molding in a state where the core metal 12a is inserted into the metal mold.

The second steering shaft 3 is supported so as to be rotatable by first and second rolling bearings 13 and 14 arranged with the worm wheel 12 interposed on the upper and lower sides in the axial direction therebetween.

An outer ring 15 in the first rolling bearing 13 is fitted in a bearing holding hole 16 provided inside a cylindrical projection 6b at a lower end of the sensor housing 6 and is held therein. An upper end surface of the outer ring 15 is abutted against an annular step 17 so that the upward movement in the axial direction of the outer ring 15 relative to the sensor housing 6 is regulated.

On the other hand, an inner ring 18 in the first rolling bearing 13 is fitted in the second steering shaft 3 by way of interference fit. A lower end surface of the inner ring 18 is abutted against an upper end surface of the core metal 12a in the worm wheel 12.

An outer ring 19 in the second rolling bearing 14 is fitted in a bearing holding hole 20 in the gear housing 7 and is held therein. A lower end surface of the outer ring 19 is abutted against an annular step 21 so that the downward movement in the axial direction of the outer ring 19 relative to the gear housing 7 is regulated.

On the other hand, an inner ring 22 in the second rolling bearing 14 is attached to the second steering shaft 3 so as to be integrally rotatable and with the relative movement in the axial direction regulated. The inner ring 22 is interposed between a step 23 in the second steering shaft 3 and a nut 24 tightened into a screw of the second steering shaft 3.

The torsion bar 4 penetrates the first and second steering shafts 2 and 3. An upper end 4a of the torsion bar 4 is connected to the first steering shaft 2 so as to be integrally rotatable by a connecting pin 25, and a lower end 4b of the torsion bar 4 is connected to the second steering shaft 3 so as to be integrally rotatable by a connecting pin 26. A lower end of the second steering shaft 3 is connected to a steering mechanism such as a rack-and-pinion mechanism, as described above, through an intermediate shaft (not shown).

The connecting pin 25 connects the first steering shaft 2 with a third steering shaft 27 arranged coaxially with the first steering shaft 2 so as to be integrally rotatable. The third steering shaft 27 penetrates a tube 28 composing a steering column.

An upper part of the first steering shaft 2 is supported on the sensor housing 6 through a third rolling bearing 29 composed of a needle roller bearing, for example, so as to be rotatable. A reduced diameter portion 30 in a lower part of the first steering shaft 2 and a hole 31 in an upper part of the second steering shaft 3 are fitted to each other with predetermined play provided therebetween in the direction of rotation such that the relative rotation between the first and second steering shafts 2 and 3 is regulated in a predetermined range.

Referring to FIG. 2, the worm shaft 11 is supported so as to be rotatable by fourth and fifth rolling bearings 34 and 35 held by the gear housing 7.

Inner rings 36 and 37 in the fourth and fifth rolling bearings 34 and 35 are fitted in corresponding constricted portions of the worm shaft 11. Further, outer rings 38 and 39 are respectively held in bearing holding holes 40 and 41 in the gear housing 7.

The gear housing 7 includes a portion 7*b* opposed to a part of a peripheral surface of the worm shaft 11 in the radial direction.

The outer ring 38 in the fourth rolling bearing 34 for supporting one end 11*a* of the worm shaft 11 is abutted against a step 42 in the gear housing 7 and is positioned therein. On the other hand, the inner ring 36 is abutted against a positioning step 43 in the worm shaft 11, thereby regulating the movement thereof toward the other end 11*b*.

The inner ring 37 in the fifth rolling bearing 35 for supporting the vicinity of the other end 11*b* of the worm shaft 11 (an end on the side of a joint) is abutted against a positioning step 44 in the worm shaft 11, thereby regulating the movement thereof toward the one end 11a. Further, the outer ring 39 is urged toward the fourth rolling bearing 34 by a screw member 45 for pre-load adjustment. The screw member 45 is screwed into a screw hole 46 formed in the gear housing 7, thereby applying a pre-load to the pair of rolling bearings 34 and 35 as well as positioning the worm shaft 11 in the axial direction. Reference numeral 47 denotes a lock nut which is engaged with the screw member 45 in order to fasten the screw member 45 after pre-load adjustment.

In the gear housing 7, an area including at least an engaged portion A of the worm shaft 11 and the worm wheel 12 is filled with the lubricant composition having the buffer particles dispersed therein, previously described. That is, with the lubricant composition, only the engaged portion A may be filled, the engaged portion A and the whole of a peripheral edge of the worm shaft 11 may be filled, or the whole of the gear housing 7 may be filled.

The present invention is not limited to the above-mentioned embodiment. Various modifications can be made within the range of items described in the claims of the present invention. For example, the configuration of the speed reduction gear according to the present invention is applicable to speed reduction gears for apparatuses other than the electric power steering apparatus.

EXAMPLES

The present invention will be described in more detail on the basis of examples.

Example 1

200 parts by weight of spherical or granular buffer particles having an average particle diameter of 120 μm composed of a thermoplastic elastomer urethane was added to 100 parts by weight of grease obtained by adding a soap-based thickening agent to poly (α-olefin) oil, followed by uniform mixing, thereby preparing grease serving as a lubricant composition whose consistency is No. 00 in terms of an NLGI number.

Comparative Example 1

Grease having no buffer particles mixed therewith was used as it is.

The speed reduction gear in the electric power steering apparatus shown in FIGS. 1 and 2 was filled with each of the greases in the example 1 and the comparative example 1, to measure a teeth striking sound. In a worm gear mechanism, a worm made of an iron-based metal and a worm wheel made of polyamide resin were combined with each other. Backlash was set to 1' and 4'. The results are shown in Table 1.

TABLE 1

| backlash | noise level (dB) | |
|---|---|---|
| | 1' | 4' |
| Example 1 | 37 | 40 |
| comparative example 1 | 49 | 55 |

From Table 1, it has been confirmed that the grease in the example 1 has the effect of more significantly reducing a teeth striking sound, which is 12 dB in a case where backlash is 1' and is 15 dB in a case where backlash is 4', as compared with the grease in the comparative example 1.

Figure 3A:
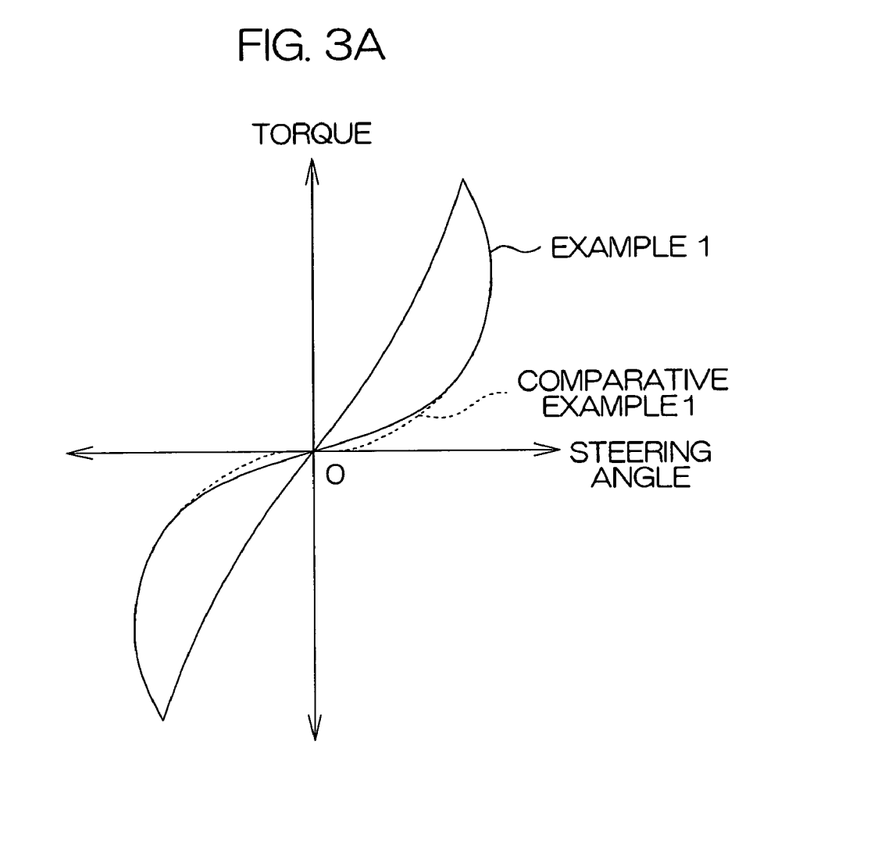
FIG. 3A is a graph showing results obtained in measuring the relationship between a steering angle and a torque in examples of the present invention.

The speed reduction gear in the same electric power steering apparatus as the above-mentioned one was filled with each of the greases in the example 1 and the comparative example 1, to measure the relationship between a steering angle and a torque. Backlash was set to 4'. The results are shown in FIG. 3A. Further, the vicinity of a starting point, having a steering angle of 0° and having no torque, in FIG. 3A is illustrated in enlarged fashion in FIG. 3B. In the drawings, a solid line indicates the results in the example 1, and a broken line indicates the results in the comparative example 1.

Figure 3B:
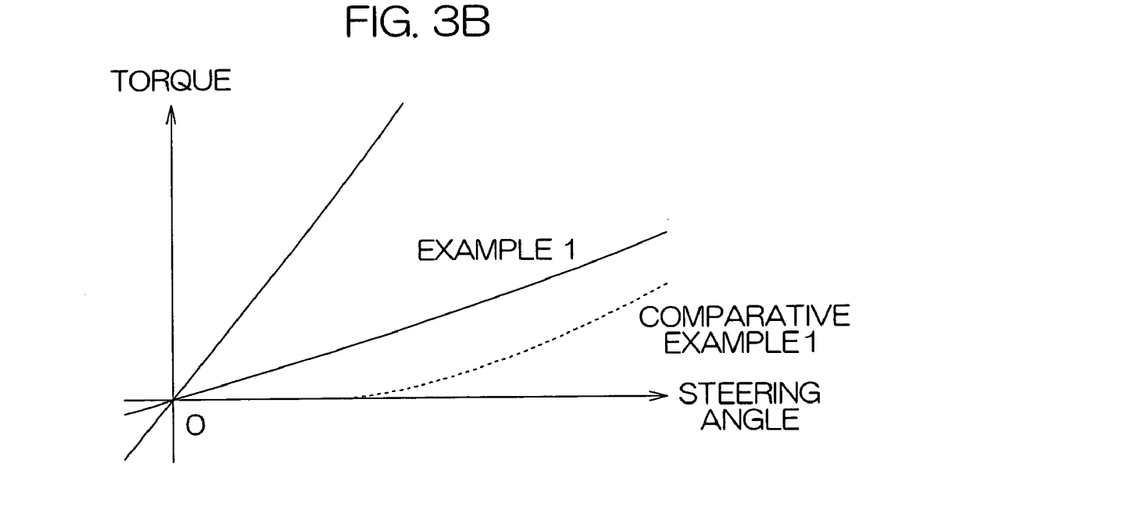
FIG. 3B is a graph showing the vicinity of a starting point of FIG. 3A in enlarged fashion.

From the drawings, in the comparative example 1, there is an idle running area where the increase in the torque corresponding to the increase in the steering angle cannot be seen in the vicinity of the starting point. Therefore, it has been found that backlash exists.

On the other hand, in the example 1, the torque increases in correspondence with the increase in the steering angle from the starting point, which means that there is no idle running area. The reason for this is that the buffer particles are interposed between gear teeth of the worm and the worm wheel. Therefore, it has been found that this state substantially corresponds to a state where there is no backlash between the gear teeth. From this cause, it has been confirmed that noise can be significantly reduced by reducing the teeth striking sound, as described above.

Examination of Particle Diameter of Buffer Particles

Spherical particles composed of a cured material of curable urethane resin (Young's modulus: 10 MPa) were used as the buffer particles. The average particle diameter thereof was changed in a range of 10 to 400 μm.

40 parts by weight of the above-mentioned buffer particles were then added to 100 parts by weight of grease obtained by adding a soap-based thickening agent to poly(α-olefin) oil, followed by uniform mixing, thereby preparing grease serving as a lubricant composition whose consistency is No. 00 in terms of an NLGI number. Further, the average particle diameter of the grease having no buffer particles mixed therewith was defined to 0 μm.

The speed reduction gear in the electric power steering apparatus shown in FIGS. 1 and 2 was filled with the grease, to measure a teeth striking sound (dB) and a sliding sound (dB). In the worm gear mechanism, the worm made of an iron-based metal and the worm wheel made of polyamide resin were combined with each other.

(Teeth Striking Sound)

In measuring the teeth striking sound, backlash (B/L) was set to 2', 3.5', and 5'.

Figure 4:
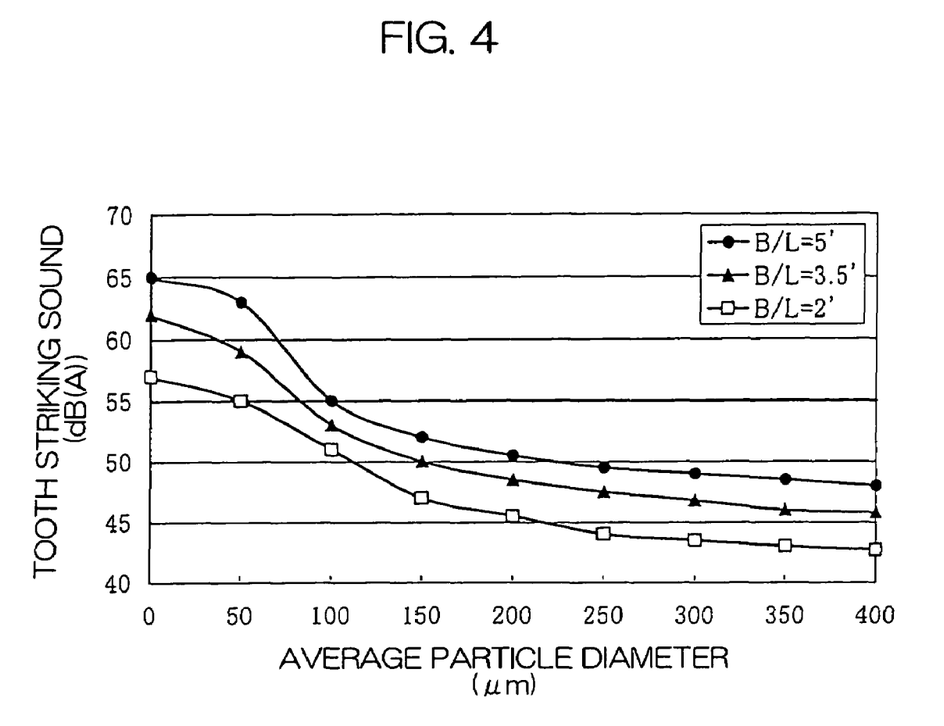
FIG. 4 is a graph showing results obtained in measuring the relationship between the average particle diameter of buffer particles and a teeth striking sound produced by a speed reduction gear in an electric power steering apparatus in examples of the present invention.

Letting 55 dB be a threshold value, the effect of reducing the teeth striking sound was estimated to be good in a case where the measured teeth striking sound was not more than the threshold value, while being estimated to be bad in a case where the measured teeth striking sound exceeded the threshold value. The results are shown in FIG. 4. A transverse line (a thick line) in the drawing indicates the threshold value. Further, a line —□—, a line —▲—, and a line —●— respectively indicate the results of the measurements in cases where the backlash is set to 2', 3.5', and 5'.

From FIG. 4, the good effects of reducing the teeth striking sound were respectively obtained in cases where the average particle diameter of the buffer particles was not less than 50 μm under the conditions of the backlash 2', was 80 μm or more under the conditions of the backlash 3.5', and was not less than 100 μm under the conditions of the backlash 5'.

This has confirmed that the average particle diameter of the buffer particles must exceed 50 μm and particularly, is preferably not less than 100 μm.

(Sliding Sound)

In measuring the sliding sound, backlash was set to 2'.

Figure 5:
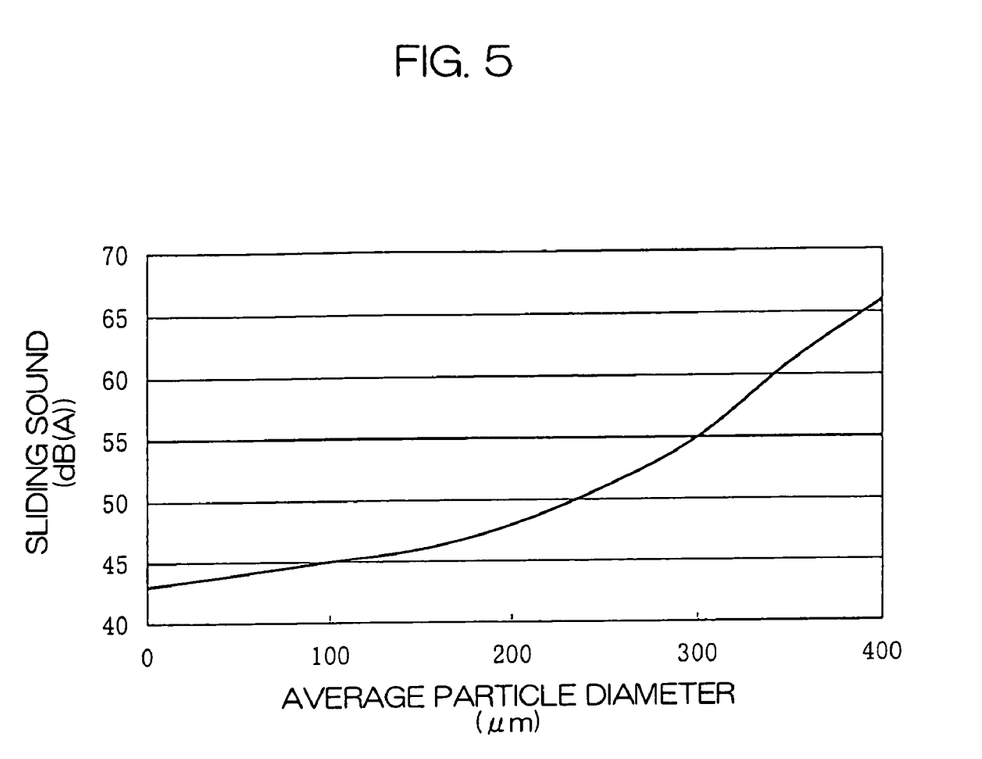
FIG. 5 is a graph showing results obtained in measuring the relationship between the average particle diameter of buffer particles and a sliding sound produced by a speed reduction gear in an electric power steering apparatus in examples of the present invention.

Letting 55 dB be a threshold value, the sliding sound was estimated to be absent (good) in a case where the measured sliding sound was not more than the threshold value, while being estimated to be present (bad) in a case where the measured sliding sound exceeded the threshold value. The results are shown in FIG. 5. A transverse line (a thick line) in the drawing indicates the threshold value.

From FIG. 5, it has been found that the sliding sound can be prevented from being produced when the average particle diameter of the buffer particles was not more than 300 μm.

This has confirmed that the average particle diameter of the buffer particles must be not more than 300 μm.

Examination of Young's Modulus of Buffer Particles

Spherical particles having an average particle diameter of 150 μm composed of a cured material of curable urethane resin were used as the buffer particles. The Young's modulus of the cured material was changed in a range of 0.01 to $10^5$ MPa.

40 parts by weight of the above-mentioned buffer particles were then added to 100 parts by weight of grease obtained by adding a soap-based thickening agent to poly(α-olefin) oil, followed by uniform mixing, thereby preparing grease serving as a lubricant composition whose consistency is No. 00 in terms of an NLGI number.

The speed reduction gear in the same electric power steering apparatus as the above-mentioned was filled with the grease, to measure a teeth striking sound (dB) and a sliding sound (dB). Both the measurements were made by setting backlash to 2'. Further, a threshold value to be a basis for the estimation was the same as the above-mentioned.

Figure 6:
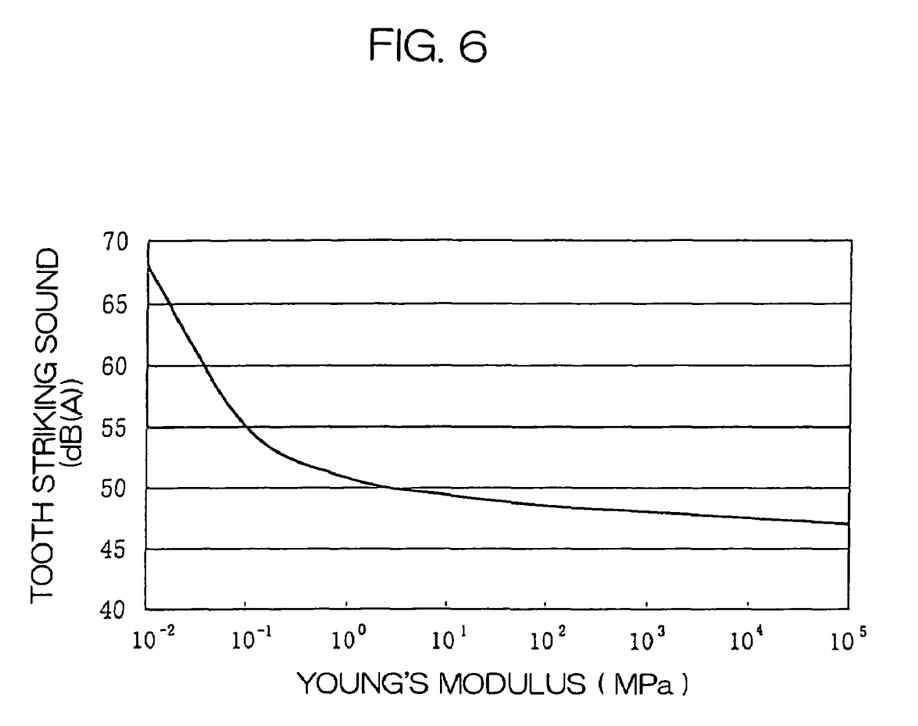
FIG. 6 is a graph showing results obtained in measuring the relationship between the Young's modulus of a buffering material forming buffer particles and a teeth striking sound produced by a speed reduction gear in an electric power steering apparatus in examples of the present invention.
Figure 7:
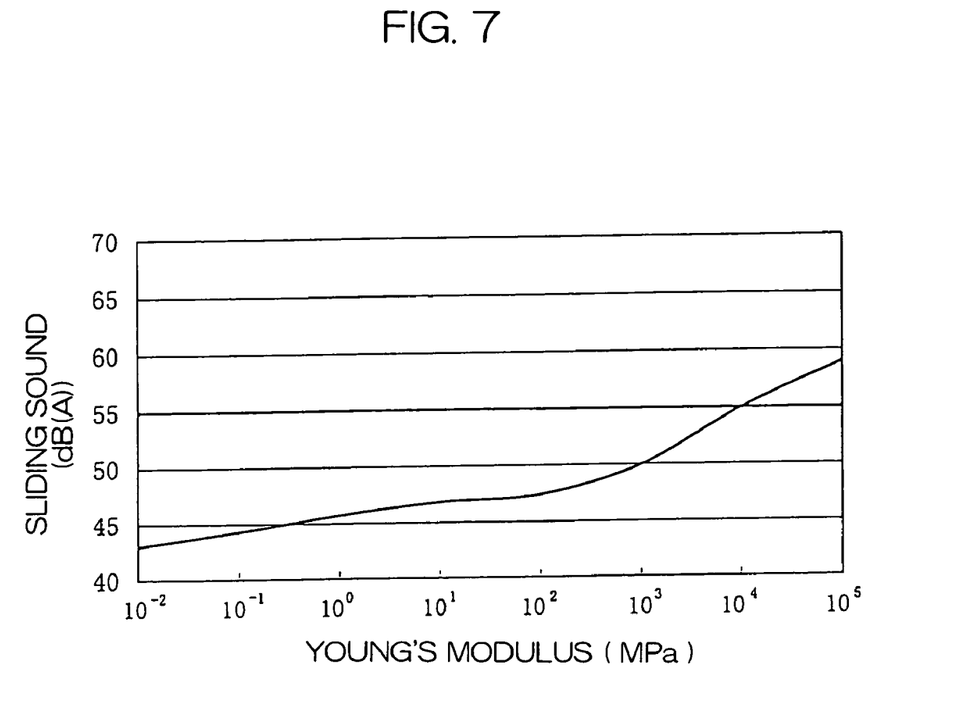
FIG. 7 is a graph showing results obtained in measuring the relationship between the Young's modulus of a buffering material forming buffer particles and a sliding sound produced by a speed reduction gear in an electric power steering apparatus in examples of the present invention.

The results of the measurement of the teeth striking sound are shown in FIG. 6, and the results of the measurement of the sliding sound are shown in FIG. 7. A transverse line (a thick line) in the drawings indicates the threshold value.

From FIG. 6, the good effect of reducing the teeth striking sound was obtained when the Young's modulus of the cured material of curable urethane resin serving as the buffering material forming the buffer particles was not less than 0.1 MPa.

This has confirmed that the Young's modulus of the buffering material forming the buffer particles is preferably not less than 0.1 MPa.

From FIG. 7, it has been found that the sliding sound can be prevented from being produced when the Young's modulus of the cured material of curable urethane resin serving as the buffering material forming the buffer particles is not more than $10^4$ MPa.

This has confirmed that the Young's modulus of the buffering material forming the buffer particles is preferably not more than $10^4$ MPa.

Examination of Mixing Ratio of Buffer Particles

Spherical particles having an average particle diameter of 150 μm composed of a cured material of curable urethane resin (Young's modulus: 10 MPa) were used as the buffer particles.

The above-mentioned buffer particles were then added by changing the mixing ratio thereof in a range of 0 to 50 parts by weight per 100 parts by weight of grease obtained by adding a soap-based thickening agent to poly(α-olefin) oil, followed by uniform mixing, thereby preparing grease serving as a lubricant composition whose consistency is No. 00 in terms of an NLGI number.

The speed reduction gear in the same electric power steering apparatus as the above-mentioned was filled with the grease, to measure a teeth striking sound (dB). The measurement was made by setting backlash to 2'. Further, a threshold value to be a basis for the estimation was the above-mentioned.

Figure 8:
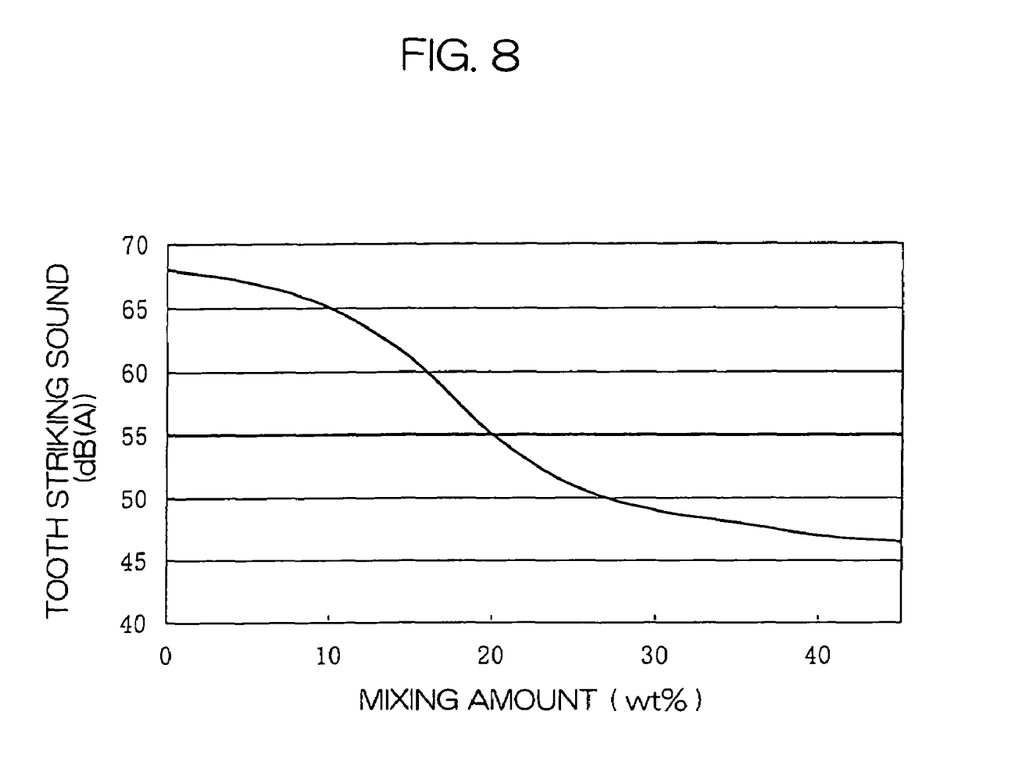
FIG. 8 is a graph showing results obtained in measuring the relationship between the mixing amount of buffer particles and a teeth striking sound produced by a speed reduction gear in an electric power steering apparatus in examples of the present invention.

The results of the measurement are shown in FIG. 8. A transverse line (a thick line) in the drawing indicates the threshold value.

From FIG. 8, the good effect of reducing the teeth striking sound was obtained when the mixing amount of the buffer particles was not less than 20 parts by weight per 100 parts by weight of the grease.

This has confirmed that the mixing amount of the buffer particles is not less than 20 parts by weight.

The invention claimed is:

1. A lubricant composition, comprising:
   a lubricant; and
   buffer particles which have a spherical shape, which have an average particle diameter $D_1$ of 50 μm<$D_1$≦300 μm and which are comprised of a buffering material whose Young's modulus ranges from 0.1 to $10^4$ MPa.

2. The lubricant composition according to claim 1, wherein the buffering material of the buffer particles is comprised of a cured material of curable urethane resin.

3. The lubricant composition according to claim 1, wherein the lubricant composition has a mixing ratio of the buffer particles to the lubricant which ranges from 20 to 300 parts by weight buffer particles per 100 parts by weight of the lubricant.

4. The lubricant composition according to claim 1, wherein the lubricant is grease having a consistency in a state where the buffer particles are added thereto that is given by an NLGI number which ranges from No. 2 to No. 000.

5. The lubricant composition according to claim 1, wherein the lubricant is lubricating oil having a kinetic viscosity which ranges from 5 to 200 mm$^2$/s (40° C.).

6. A speed reduction gear comprising:
a small gear and a large gear that define an area when engaged which includes an engaged portion of both the small gear and the large gear and which is filled with the lubricant composition of claim 1.

7. An electric power steering apparatus comprising:
an electric motor for steering assist which has an output that is transmitted to a steering mechanism by reducing its speed through the speed reduction gear of claim 6.

* * * * *